United States Patent
Saito et al.

(10) Patent No.: US 6,657,831 B2
(45) Date of Patent: Dec. 2, 2003

(54) INFORMATION SIGNAL RECORDING AND PLAYBACK METHOD AND APPARATUS THEREFOR

(75) Inventors: Seiichi Saito, Yokohama (JP); Toshifumi Takeuchi, Yokohama (JP); Masafumi Nakamura, Yokohama (JP); Junji Shiokawa, Yokohama (JP); Osamu Kawamae, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/187,298

(22) Filed: Jul. 2, 2002

(65) Prior Publication Data

US 2002/0167747 A1 Nov. 14, 2002

Related U.S. Application Data

(63) Continuation of application No. 09/268,657, filed on Mar. 16, 1999, now Pat. No. 6,424,477, which is a continuation of application No. 08/714,823, filed on Sep. 17, 1996, now Pat. No. 5,956,193, which is a continuation of application No. 08/583,861, filed on Jan. 11, 1996, now Pat. No. 5,589,995, which is a continuation of application No. 08/218,701, filed on Mar. 28, 1994, now abandoned, which is a continuation of application No. 07/956,597, filed on Oct. 5, 1992, now abandoned, which is a continuation of application No. 07/428,949, filed on Oct. 30, 1989, now abandoned.

(30) Foreign Application Priority Data

Nov. 2, 1988 (JP) .......................................... 63-276243

(51) Int. Cl.$^7$ ................................................. G11B 5/09
(52) U.S. Cl. ..................................................... 360/480
(58) Field of Search ....................... 360/48, 61; 386/33, 386/40, 95, 45, 46, 124–126; 714/755

(56) References Cited

U.S. PATENT DOCUMENTS

| 4,081,844 A | 3/1978 | Devore et al. |
| 4,402,021 A | 8/1983 | Sonoda et al. |
| 4,525,840 A | 7/1985 | Heinz et al. |
| 4,549,229 A | 10/1985 | Nakano et al. |
| 4,630,272 A | 12/1986 | Fukami et al. |

(List continued on next page.)

FOREIGN PATENT DOCUMENTS

| EP | AO300732 | 7/1986 |
| EP | 0242093 | 10/1987 |
| EP | A0208536 | 7/1988 |
| JP | 60-106072 | 6/1985 |

(List continued on next page.)

Primary Examiner—David Hudspeth
Assistant Examiner—K. Wong
(74) Attorney, Agent, or Firm—Mattingly, Stanger & Malur, P.C.

(57) ABSTRACT

In an apparatus for recording and reproducing a burst-like digital information signal, a methd capable of predicting the time of occurrence of a header indicating the head of the first data of a digital information signal during its reproduction from a recording medium. The digital signal includes a plurality of data blocks each including a header indicative of the head of the block, and each header includes the address of the block. During recording of the digital signal on the recording medium, a plurality of headers which are substantially the same as the headers of the data blocks and including addresses having given relations with the addresses of the data blocks are inserted in a clock regenerating signal recorded before the digital signal for regenerating the clocks for the signal. The headers are inserted at a period equal to the length of each data block so as to be synchronized with the headers of the data blocks.

8 Claims, 17 Drawing Sheets

U.S. PATENT DOCUMENTS

| | | |
|---|---|---|
| 4,700,240 A | 10/1987 | Umemoto et al. |
| 4,774,701 A | 9/1988 | Ozaki et al. |
| 4,777,542 A | 10/1988 | Ozaki |
| 4,792,936 A | 12/1988 | Picard |
| 4,811,126 A | 3/1989 | Suzuki et al. |
| 4,819,088 A | 4/1989 | Higurashi |
| 4,835,628 A | 5/1989 | Hinz et al. |
| 4,858,035 A | 8/1989 | Hikawa |
| 4,862,295 A | 8/1989 | Tanaka et al. |
| 4,899,232 A | 2/1990 | Odaka et al. |
| 4,955,022 A | 9/1990 | Odaka et al. |
| 5,012,459 A | 4/1991 | Odaka et al. |
| 5,117,313 A | 5/1992 | Lokhoff et al. |
| 5,172,380 A | 12/1992 | Odaka |
| 5,218,454 A | 6/1993 | Nagasasa et al. |
| 5,579,183 A | 11/1996 | Van Gestel et al. |
| 5,589,995 A | 12/1996 | Saito et al. |
| 5,956,193 A | 9/1999 | Saito et al. |
| 6,424,477 B1 * | 7/2002 | Saito et al. .................. 360/48 |

FOREIGN PATENT DOCUMENTS

| | | |
|---|---|---|
| JP | 60-247867 | 12/1985 |
| JP | 01-34969 | 6/1986 |
| JP | 61-261874 | 11/1986 |
| JP | 61-271668 | 12/1986 |
| JP | 62-031069 | 2/1987 |
| JP | 62-262274 | 11/1987 |
| JP | 63-202150 | 8/1988 |
| JP | 01-11996 | 5/1989 |

* cited by examiner

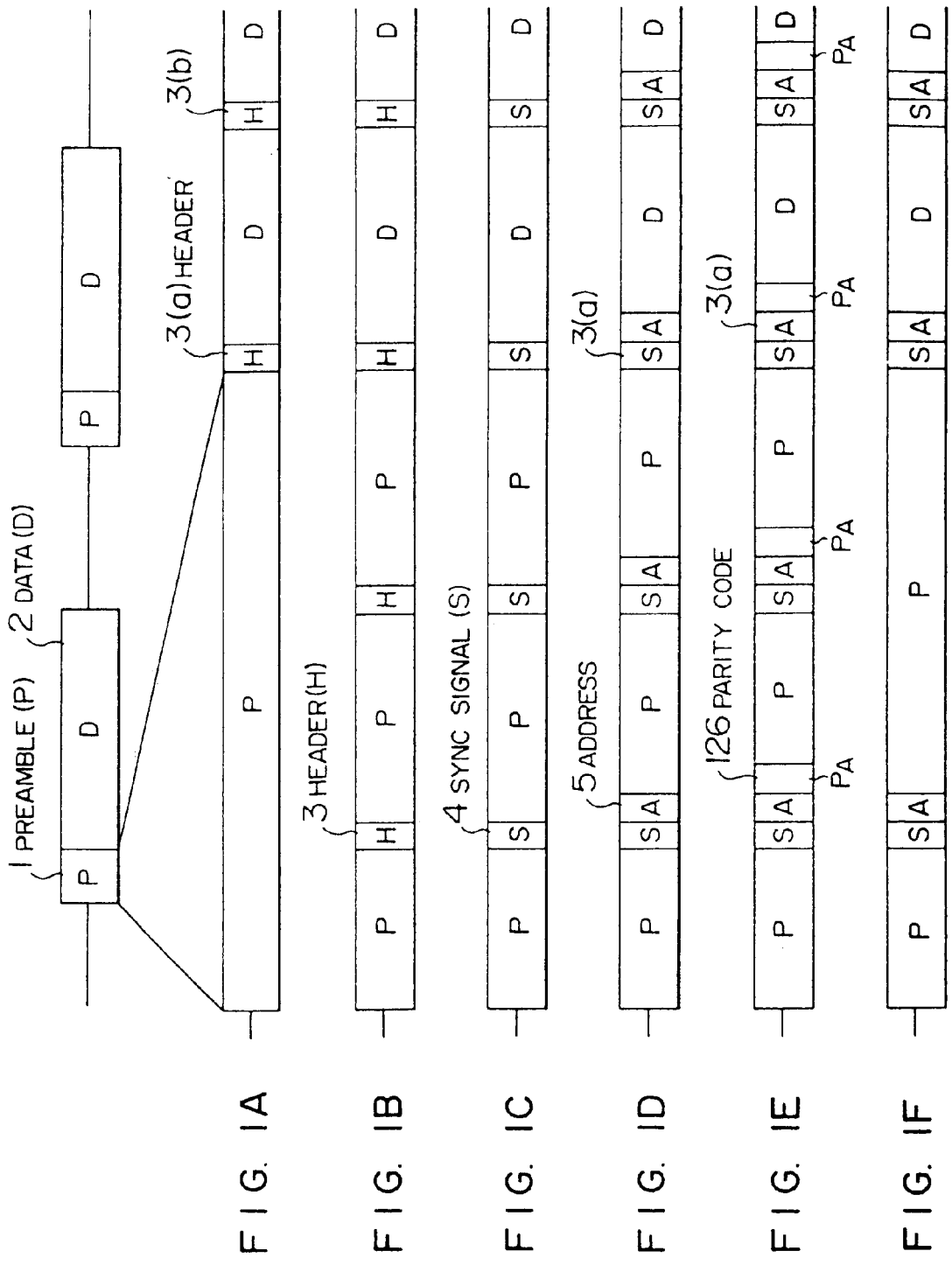

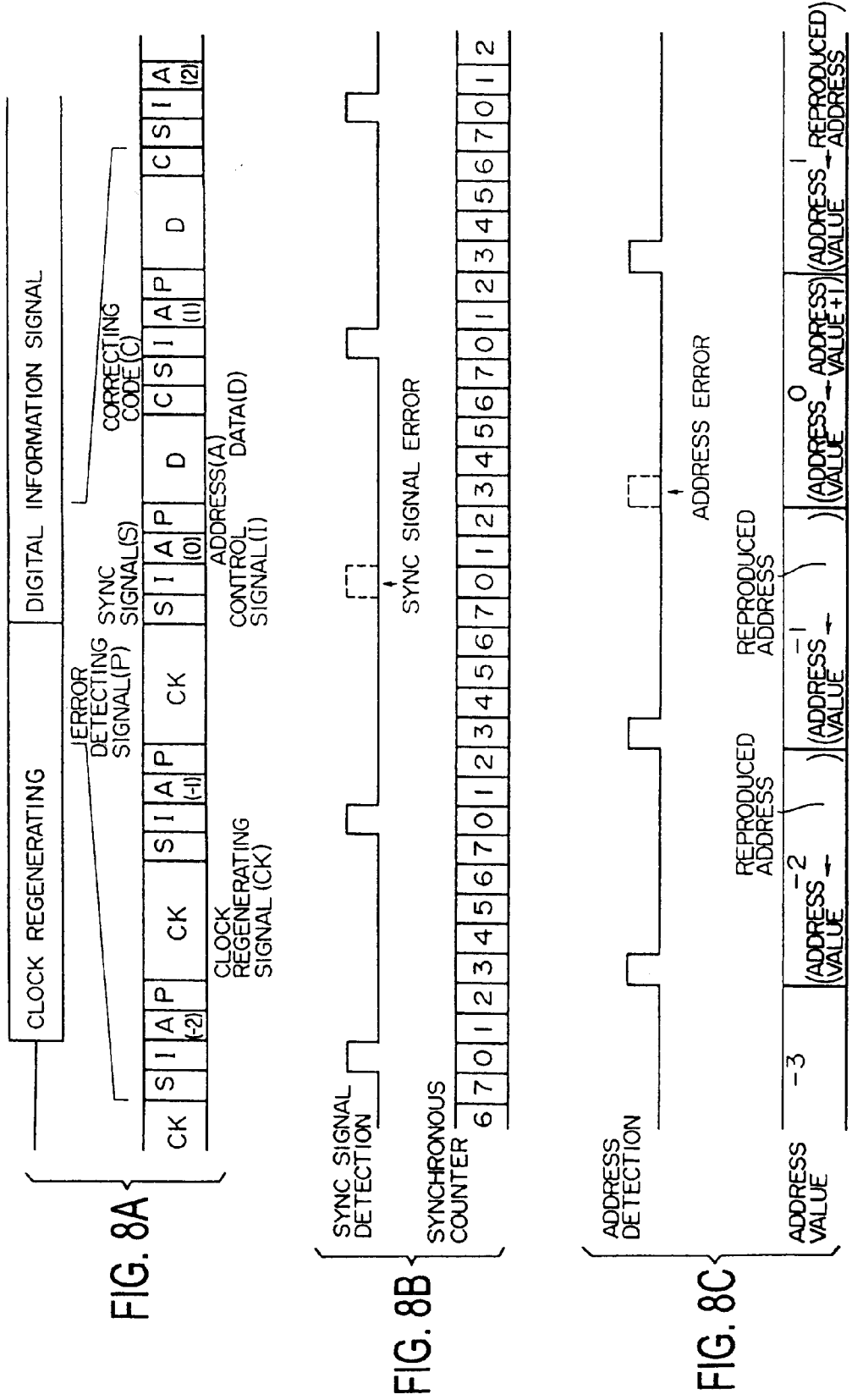

INFORMATION SIGNAL RECORDING AND PLAYBACK METHOD AND APPARATUS THEREFOR

This is a continuation application of U.S. Ser. No. 09/268,657, filed March 16, 1999, now U.S. Pat. No. 6,424,477 which is a continuation application of U.S. Ser. No. 08/714,823, filed Sep. 17, 1996 now U.S. Pat. No. 5,956,193; which is a continuation application of U.S. Ser. No. 08/583,861, filed Jan. 11, 1996, now U.S. Pat. No. 5,589,995; which is a file wrapper continuation application of U.S. Ser. No. 08/218,701, filed Mar. 28, 1994, now abandoned; which is a file wrapper continuation application of U.S. Ser. No. 07/956,597, filed Oct. 5, 1992, now abandoned; which is a file wrapper continuation application of U.S. Ser. No. 07/428,949, filed Oct. 30, 1989, now abandoned.

BACKGROUND OF THE INVENTION

The present invention relates to a method and apparatus for recording and playing back PCM signals from a magnetic tape and more particularly to a synchronization protecting apparatus well suited for recording and playing back a PCM sound when the overlap area of an 8 mm video tape recorder is expanded.

In the past, the track format 31 of the conventional 8 mm video tape recorder has been determined as shown in FIG. 12. As shown in the Figure, a video signal 34 is recorded on an area 31 V corresponding to the cylinder head wrapping portion of 185 degrees and a PCM sound signal 37 time-base compressed to sterephonic sound data for one field is recorded on an area 31P overlapping 36-degrees in the direction of the head scan entering side of the video signal 34. The 36-degree overlap area 31P includes a scan starting section 39 (a margin section for a head scan starting point), a preamble 38 (a clock regenerating signal for clock pull-in purposes), the PCM sound signal 37, a postamble 36 (a margin section during the period of after recording) and a VP guard 35 (a guard section between the video signal and the PCM sound signal), and the PCM sound data 37 begins at the position of 5 degrees from the head scan entering side. Then, the signals 38 to 36 are subjected to biphase mark modulation and recorded on the magnetic tape. With this PCM sound of the conventional 8 mm video tape recorder, the sampling frequency is 31.5 kHz and the number of quantization bits is 10. These values are inferior in sound quality as compared with the sampling frequencies of 48 kHz and 44.1 kHz and the number of quantization bits or 16 bits which are the main trends in the field of CD and DAT. However, since the PCM sound whose sampling frequency is 48 kHz and whose number of quantization bits is 16 has an amount of information which is about three times that of the conventional PCM sound, any attempt to realize such amount of information in the same overlap area 31P of 36 degrees as previously by utilizing the conventional PCM sound system requires a line recording density of about 3 times the conventional one.

Thus, the optimization of the correcting codes has been effected to reduce the line recording density and yet the line recording density of about 2.5 times has been required. And, in an attempt to realize a high-density magnetic recording, a high-performance tape has been used to optimize the modulation system and yet it has been limited to the recording and playback of the line recording density of about 2 times that of the conventional PCM sound.

Therefore, in order that a PCM sound whose sampling frequency is 48 kHz and number of quantization bits is 16 may be realized in an 8 mm video tape recorder, there is no alternative but to expand the overlap area 31P of 36 degrees. FIG. 12 shows a new 8 mm track format 32 in which the overlap area is expanded by 5 degrees. By so expanding the overlap area 32P into a linear audio track which is not used, it is possible to realize a PCM sound having the sampling frequency of 48 kHz and the number of quantization bits of 16 with a line recording density of slightly over 2 times the conventional one (see JP-A-1-119966).

By expanding the overlap area by 5 degrees, it is possible to realize a sound having a sampling frequency of 48 kHz and 16 quantization bits in terms of line recording density. However, as shown in FIG. 12, expanding the overlap area by 5 degrees reduces the distance from the lower edge of a magnetic tape 10 and hence the head playback output at around the head entry side of the track 32. This is due to the fact that upon the entry of the cylinder head, the lower edge of the magnetic tape 10 is turned up thereby increasing the gap between the head and the tape. In this way, at around the head entry side the S/N ratio is deteriorated by the reduced playback output and hence the error rate is deteriorated.

On the other hand, the vicinity of the head entry side is also near to the head of PCM sound data 42 and therefore a burst error tends to occur. This is due to a synchronization error. The PCM sound data 42 has a format 50 such as shown in FIG. 13 and the sound data for one field is divided into several blocks. Each block is added, as a header 51, with a synchronizing signal, ID code (control signal), block address and parity code as shown in FIG. 3 and they serve important roles such as the synchronization for converting serial signal data into parallel signal data in terms of symbols and the generation of the accurate RAM address for the sound data in the block. As a result, a measure is taken so that during the period of playback the synchronizing signal and the block address in the header 51 are protected by referring to the information preceding several blocks thereby reducing the effect due to any desynchronization or block address error. However, there is no information to be referred to for the synchronizing signal and the block address in the leading block and the protection is deteriorated. More specifically, if an error is caused in the header 51 of the leading block, during the data conversion in terms of symbols a synchronization error or RAM address error is caused thereby causing a situation equivalent to the occurrence of a burst error of the block length even if the sound data in the block is correct entirely.

In this manner, the expansion of the overlap by 5 degrees deteriorates the playback output at around the head of the track as well as the error rate. Also, the probability of a synchronization error or address error in the leading block is increased and a burst error of the block length tends to occur. As a result, the probability of generating sound data by interpolation is increased thus giving rise to a problem of deterioration in the sound quality.

Disclosed in JP-A-60-247867 is a technique for recording a synchronizing signal pattern in the area of synchronizing clock signals for signal playback purposes with a view to preventing such synchronization error in the leading block of a track.

SUMMARY OF THE INVENTION

It is an object of the present invention to provide means for protecting the synchronizing signal and block address in a header of a leading block.

Here, let us note a preamble positioned in the head entry side of PCM sound data. This preamble signal is provided for the reason that a clock regenerating circuit requires a pull-in time of several tens μs for the regeneration of the normal frequency from the free running frequency and usually the minimum recording wave length is recorded in order to increase the edge component. However, even if the header including the synchronizing signal, etc., is written in the preamble, such information is subjected to the same digital modulation as the data to manage the maximum recording wave length and therefore no considerable effect is caused on the pull-in time.

Thus, the above-mentioned object is accomplished by writing the header information in the preamble to form a dummy block structure.

By thus forming the preamble into a dummy block structure including the headers, the dummy block performs the same function as the leading data block of the PCM sound data so that the leading data block of the PCM sound data is enabled to refer to the synchronizing signals or the block addresses of the preceding blocks so as to provide an effective protection.

In accordance with the present invention, by virtue of the expanded overlap area there is an effect that even if the playback output at around the head scanning starting point is reduced so that the error rate is deteriorated and an error is caused in the header of the leading data block, it is possible to ensure the protection of the synchronizing signal, the protection of the block address and the generation of an address thereby preventing the occurrence of a burst error of a length corresponding to the block due to a synchronization error or block address error in the leading block.

BRIEF DESCRIPTION OF THE DRAWINGS

FIGS. 1A, 1B, 1C, 1D, 1E and 1F are diagrams showing basic data arrangements according to an embodiment of the present invention.

FIGS. 8A, 8B and 8C show examples of the regenerating operations of a regenerating signal of a digital information signal, with FIG. 8A showing an arrangement of the digital information signal, 8B showing a regenerating operation when the synchronizing signal is detected being in error and 8C showing a regeneration operation when the address is detected being in error.

DESCRIPTION OF THE PREFERRED EMBODIMENTS

Figure 2A:
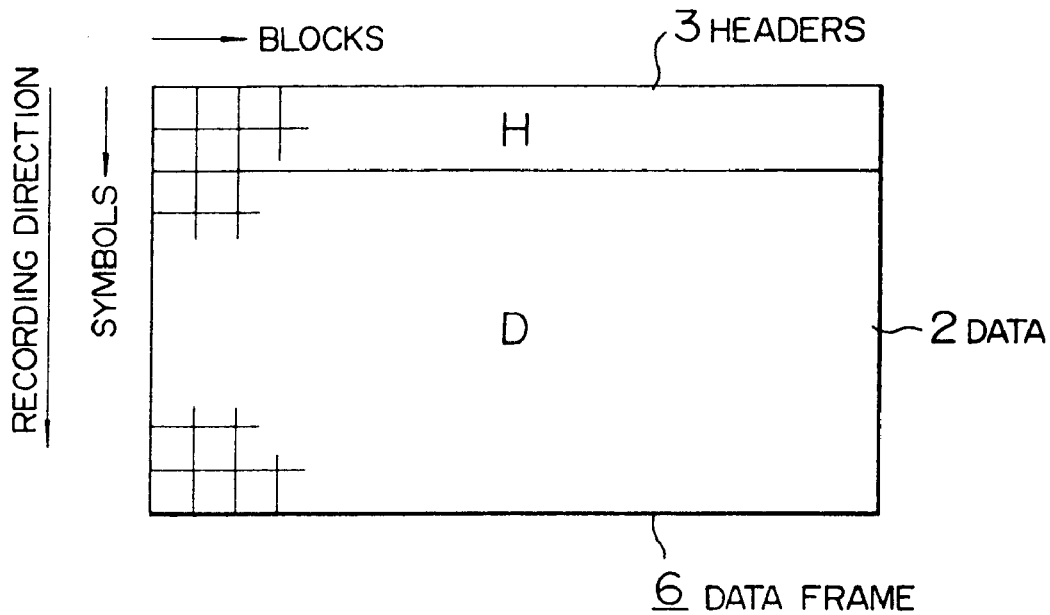
FIGS. 2A and 2B are diagrams showing basic data arrangements in a data frame according to the embodiment of the invention.

The first embodiment of the present invention will now be described. FIGS. 1A, 1B, 1C, 1D, 1E and 1F show the arrangements of data when the present invention is applied to a digital information signal which is transmitted or recorded in burst form. In FIGS. 1A to 1E, symbol P designates preamble signals 1, D digital signal data 2, H headers 3, S synchronizing signals 4, A addresses 5, and PA parity codes 126. In the case of a digital information signal which is transmitted or recorded in burst form, a preamble signal for clock regenerating purposes must be recorded in the portion preceding the digital information signal in time. The present invention notes the preamble signal which is present before the digital information signal. The digital information signal is usually formed into a frame including a plurality of data blocks and a header including a synchronizing signal, address, etc., is arranged at the head of each data block. The synchronizing signal synchronizes the data block and it also deals with desynchronization of the block, etc. The address of the data block is written as the address and it is utilized for the generation of an RAM address during the period of signal processing. In the arrangement of the digital signal, the header is written in the data at intervals of a given time as shown in FIG. 1A.

Consider now a case where an error is caused in the header in FIG. 1 showing the conventional data arrangement. Firstly, where an error is caused in any other header than the leading header 3(a) or a header 3(b), for example, if the header 3(a) has been detected and synchronization has been established, the synchronous state can be maintained by utilizing the fact that the headers are written at intervals of the given time and also the value of the RAM address of the header 3(b) can be accurately predicted due to the fact that the address of the header 3(a) has been read. However, where an error is caused in the leading header 3(a), it is impossible to make a confirmative determination as to the synchronous state to be referred to or whether the error has been caused in the leading header and hence it is impossible to predict the values of the RAM addresses of the header 3(b) and the following. As a result, the contents of the data become erroneous until the accurate header is detected. Thus, as in the case of FIG. 1B showing a data arrangement according to the first embodiment of the present invention, if headers 3 are written in a preamble signal 1 such that they are synchronized with the headers in the data, so far as any header in the preamble signal 1 has been detected, it is possible to maintain the synchronous state and accurately predict the values of the RAM addresses even if an error is caused in the leading header of the data. In the case of FIG. 1C where synchronizing signals are written as headers, if synchronization is established by the synchronizing signals in the preamble signal 1, the data can be reproduced even if the synchronizing signal is detected being in error. In the case of FIG. 1D where a synchronizing signal and an address are written as each header, if values which allow prediction of the value of the leading address of the data are written as the addresses in the preamble, not only an error in the synchronizing signal can be dealt with but also the position of the leading header 3(a) of the data blocks can be predicted. In addition, the fact that the address 5 is written to succeed the synchronizing signal 4 can be utilized such that even if the same waveform as the synchronizing signal is generated at a place other than the position of the proper synchronizing signal in the preamble signal during the regenerating operation, by determining for example whether the waveform is accompanied with the address signal, it is possible to determine whether the waveform is the regular synchronizing signal.

Referring to FIG. 1E where an address parity code 126 is written, in addition to a synchronizing signal 4 and an address 5, as each header so that even if the address is reproduced erroneously, the error in the address can be corrected by the parity check. The headers 3 can be written at intervals of a given time in a preamble 1, and in the embodiment of FIG. 1E they are written at a period which is two times the data block length. The same modulation system as the data can be used on the headers in the preamble to manage the maximum recording wave length and thus no considerable effect is caused on the time for clock regeneration. It is to be noted that while the preamble signal for PCM signal reproducing purposes includes generally a clock regenerating signal for clock regenerating purposes, in the case of regenerating for example a carrier-suppressed signal as in the S-VHS system, in order to regenerate the same carrier as the recording side on the reproducing side, during the recording a carrier regenerating signal can be recorded along with a clock regenerating signal so as to insert the previously mentioned headers into these signals.

Figure 2B:
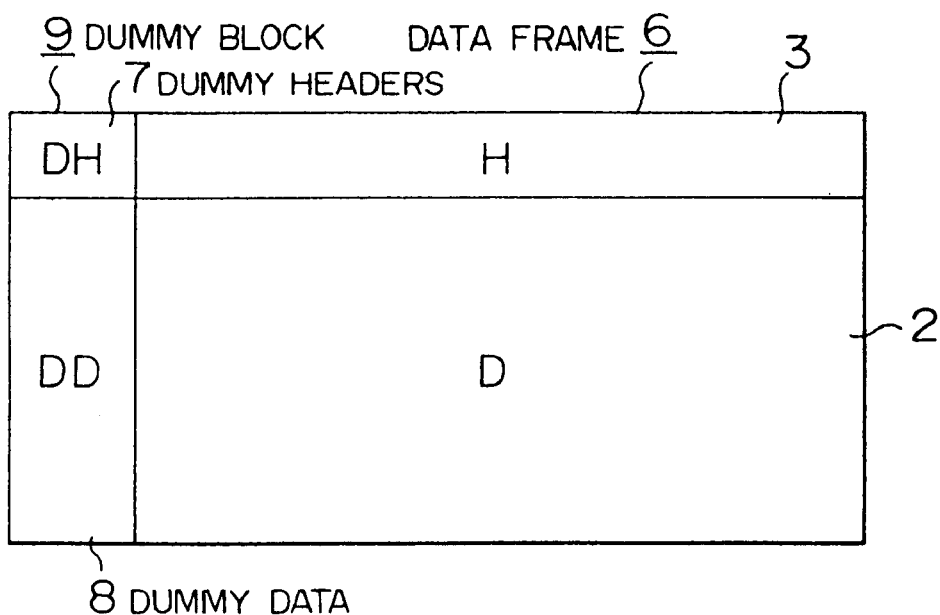

The second embodiment of the invention will now be described. FIG. 2B is a diagram showing a data arrangement obtained when the present invention is applied to a digital information signal of the data frame structure such as shown in FIG. 2A which is transmitted or recorded in burst form. Where the digital signal data has the frame structure as shown in FIGS. 2A and 2B, a preamble 1 can be formed into a block structure so that by recording a dummy header 7 of the same structure as the headers of a data frame 6 along with a dummy block 9 as shown in FIG. 2B, during the reproduction the same effects as the previously mentioned first embodiment can be obtained with respect to the synchronization and the generation of RAM addresses. Also, when protecting the synchronizing signal and the address during the reproduction, the dummy header 7 is the same in structure as the header 3 of the data frame 6 and therefore there is no need to newly add any special protective method. Then, as the value of the dummy data 8 in the dummy block 9, data is written which makes a recording or transmitting waveform advantageous for clock regeneration when using the same modulation as the data frame 6.

Figure 3:
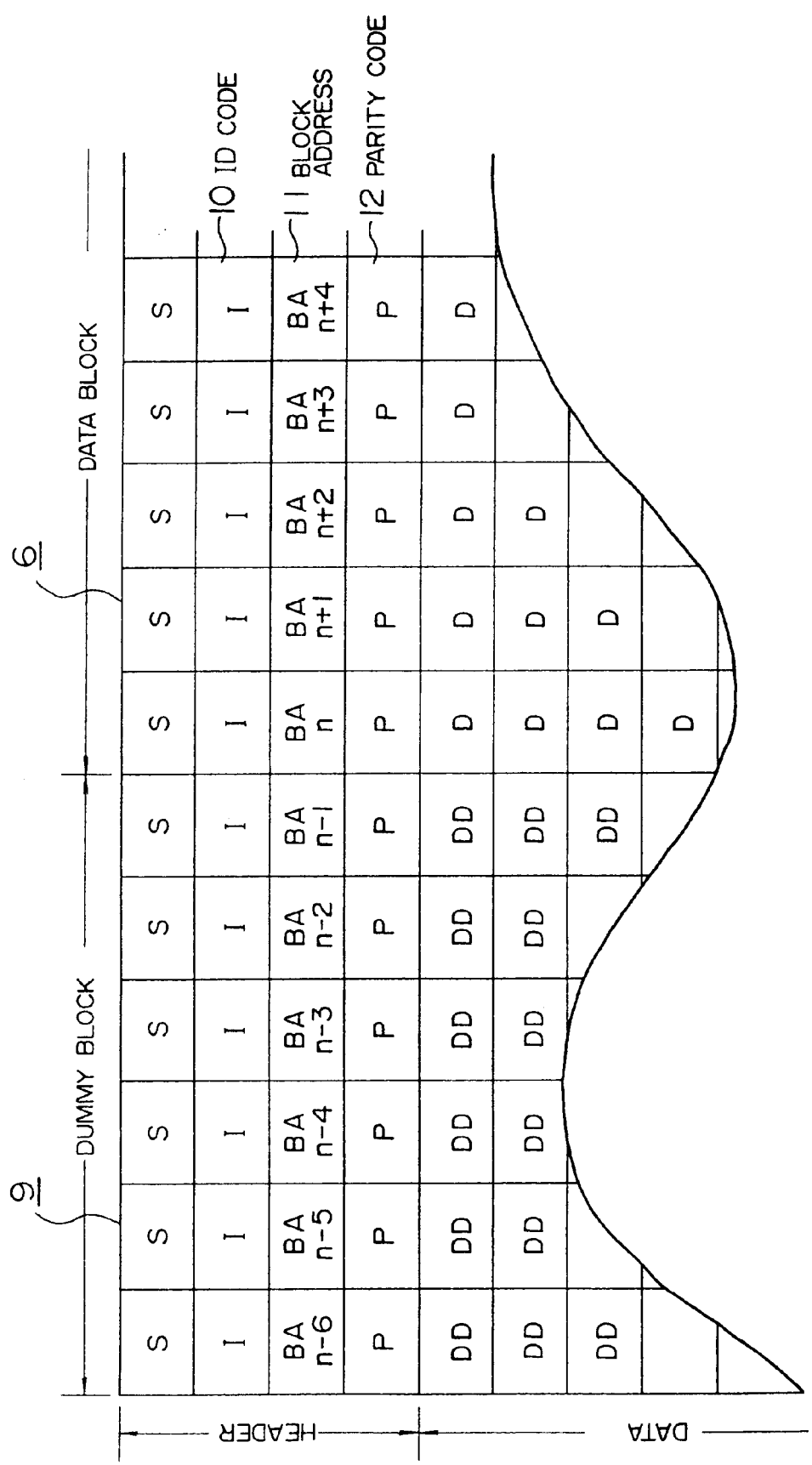
FIGS. 3, 4 and 5 show respectively the address arrangements in data frames according to the embodiment of the invention.
Figure 4:
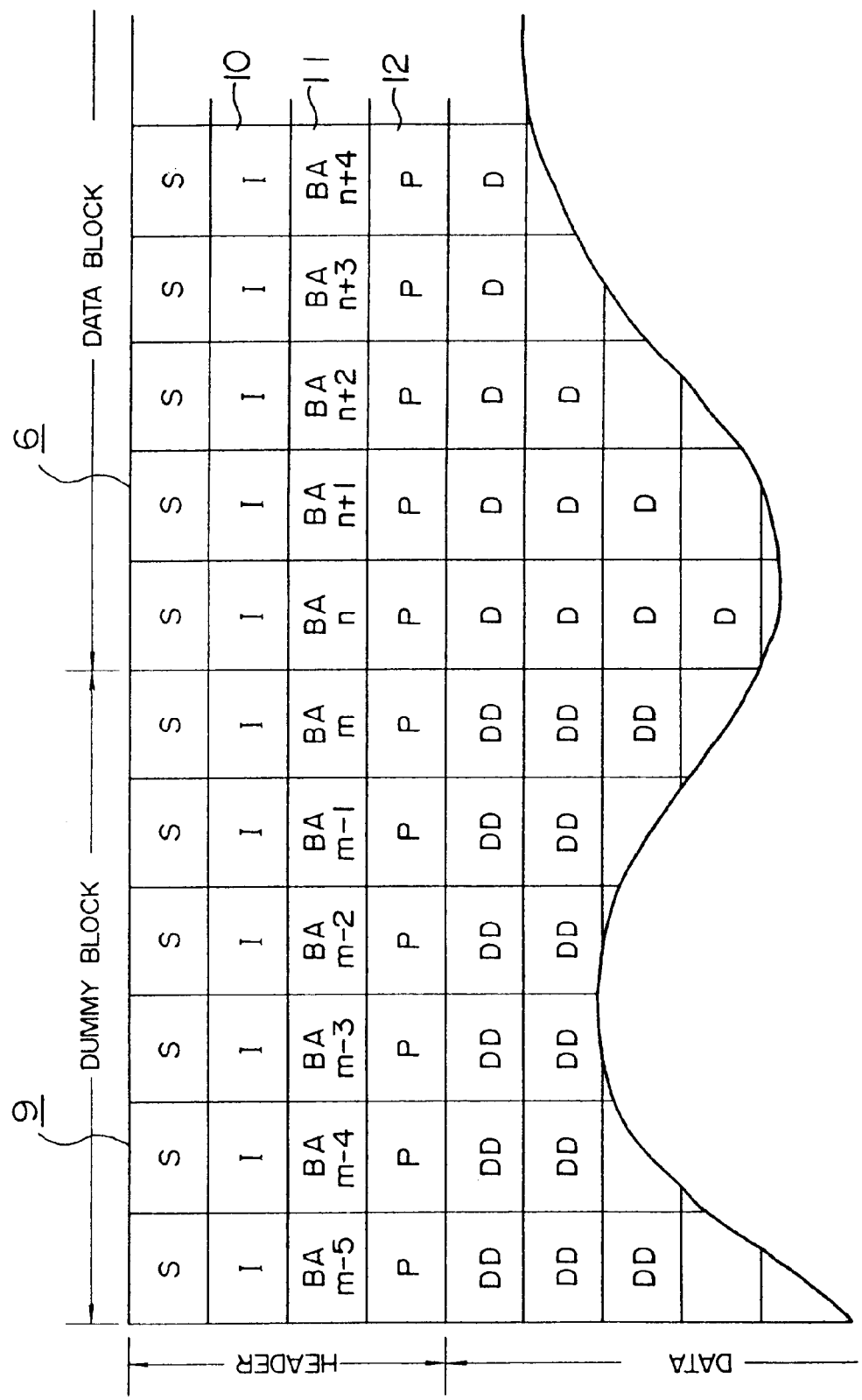
Figure 5:
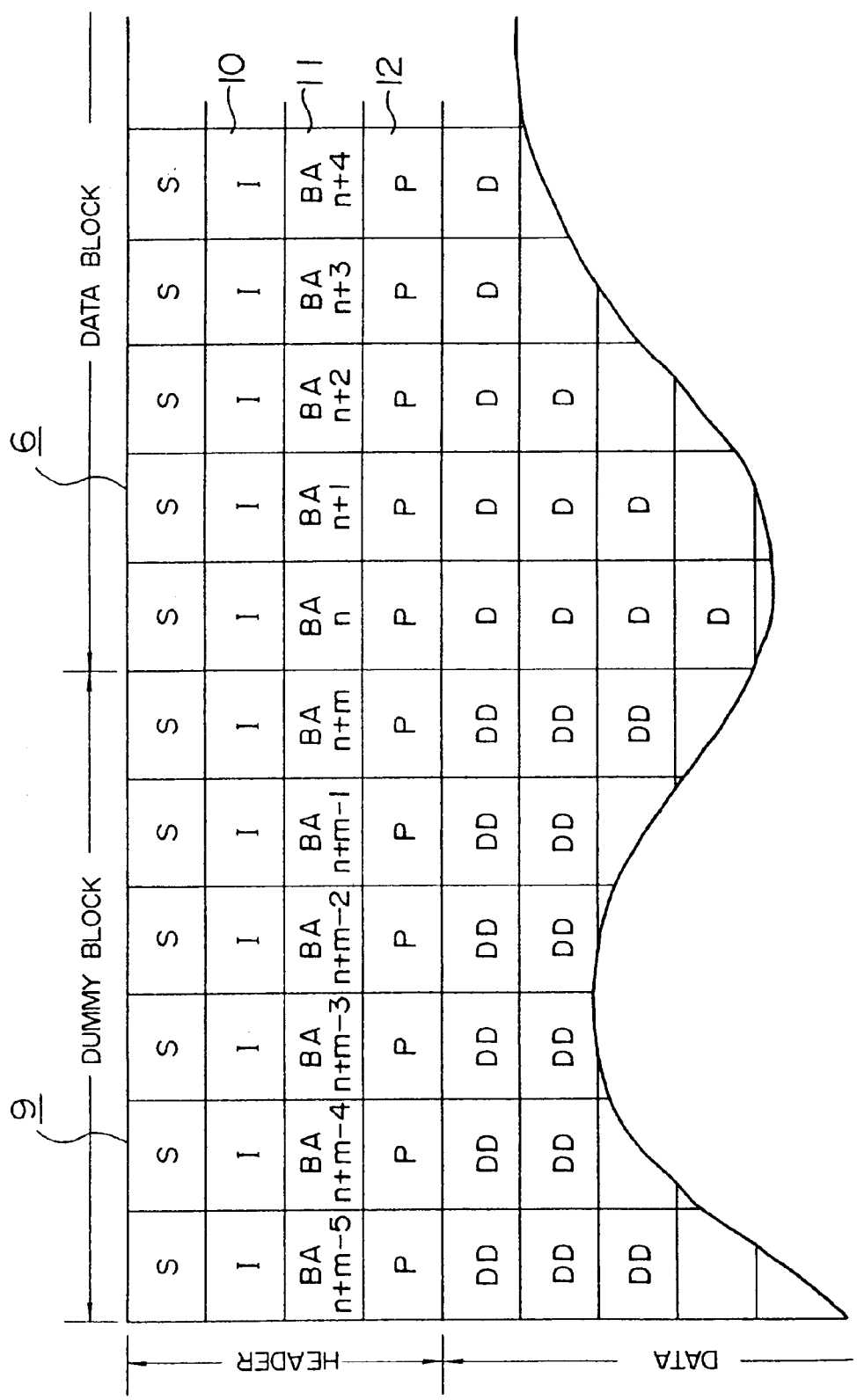

Specific exemplary methods of designating block addresses 11 of the dummy block 9 and the data blocks will now be described. FIGS. 3 to 5 show the methods of designating the block addresses 11 of the dummy block 9 when the leading address of the data blocks is n. In the Figures, symbol S designates synchronizing signals, I ID codes (control signals), BA block addresses, P parity codes, DD dummy data and D data. In the case of FIG. 3, the block addresses of the dummy block 9 are respectively designated as n−6, n−5, n−4, n−3, - - - with respect to the leading address n of the data blocks, so that if any one of the block addresses of the dummy block 9 is reproduced as the accurate address, it is possible to determine the number of blocks by which this address precedes the leading address n so that even if all of the following block addresses of the dummy block cannot be reproduced, the position of the leading address n of the data blocks can be predicted accurately. FIG. 4 shows a case where addresses which are not present in the block addresses 11 of the data frame 6 are used as the block addresses of the dummy block 9. This system has the advantage of easily distinguishing the dummy block from the data blocks.

FIG. 5 shows an embodiment of the method of designating the block addresses 11 which ensures matching between the addresses and the control signals when there are given relations therebetween. There are cases where the control signals have different control contents in relation with the addresses so as to perform more complicated controls. For instance, there is an instance where the control signal of a block having an odd-numbered address performs a control designated as "A" and the control signal of a block having an even-numbered address performs a control designated as "B". Thus, in the present embodiment, if m represents the number of blocks in the data frame 6 and k the number of headers in the dummy block 9, by designating the leading to the last block addresses as n+m−k, n+m−(k−1), - - - n+m−1 or n+m−(k−1), n+m−(k−2), - - - , n+m, the previously mentioned matching between the addresses and the control signals can be ensured.

In this way, by using as the block addresses of the dummy block 9 such values capable of predicting the value of the leading address n of the data blocks in the data frame 6 in accordance with a certain rule, it is possible to generate an accurate address even if an error is caused in the header of the leading data block.

Figure 6:
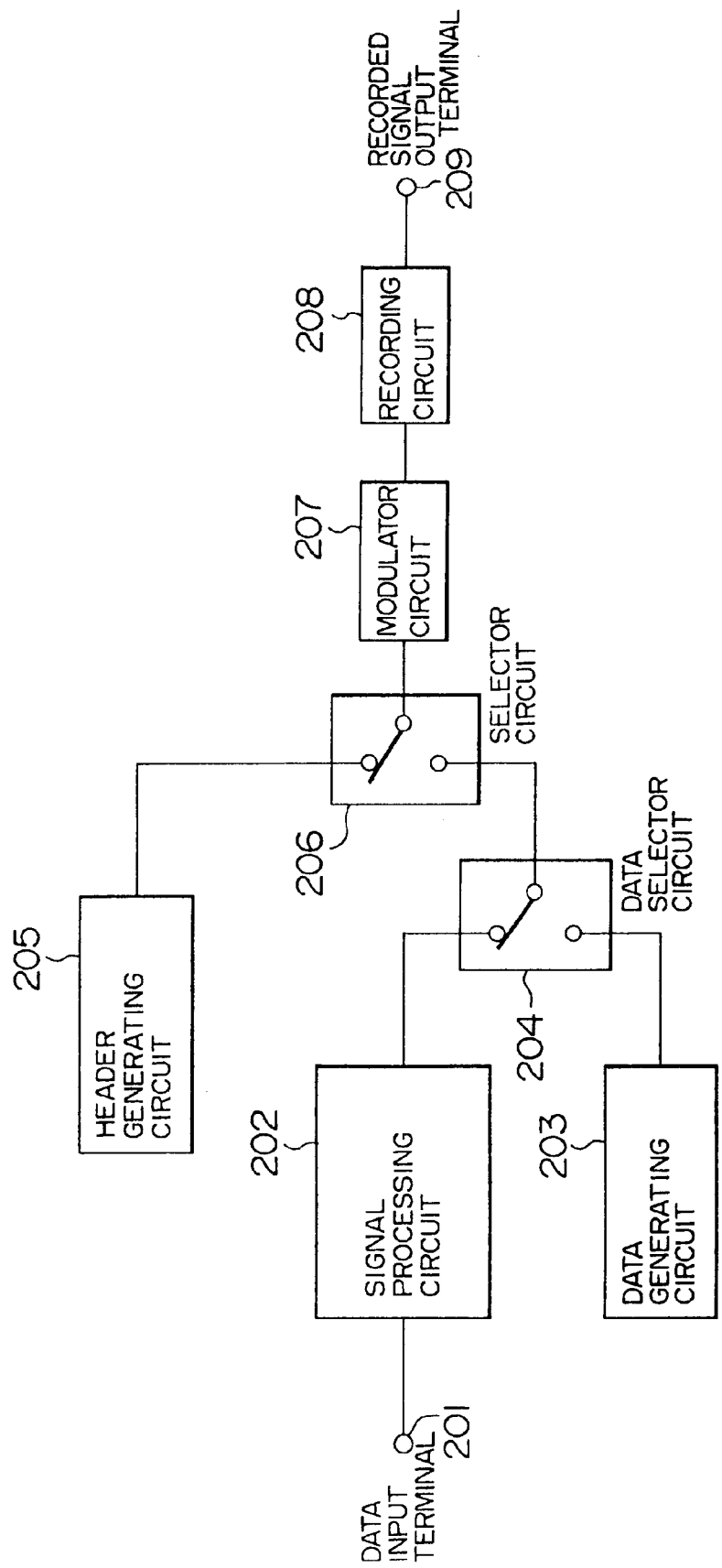
FIG. 6 is a basic block diagram of an embodiment of a recording apparatus according to the invention.

The third embodiment of the invention will now be described. FIG. 6 is a basic block diagram of an embodiment of a recording apparatus for recording a digital information signal on a magnetic tape in accordance with the present invention. The digital information signal applied to a data input terminal 201 is applied to a signal processing circuit 202. The signal processing circuit 202 performs interleaving of the data, the generation and addition of error correcting codes, etc., and data generating circuit 203 generates data which is modulated into a clock regenerating signal after the modulation. The outputs of the signal processing circuit 202 and the data generating circuit 203 are applied to a data selector circuit 204 so that the input from the data generating circuit 203 is selected and generated during the interval of the clock regenerating signal and the input from the signal processing circuit 202 is selected and generated during the interval of the digital information signal. A header generating circuit 205 generates synchronizing signals, addresses, control signals and error detecting signals. As regards the method of designation used in the generation of addresses, where the designation of addresses is to be effected as for example in the case of the embodiment of FIG. 3, if n represents the leading address, the addresses are designated in time sequence as n, n+1, n+2, - - - in the interval for recording the digital information signal, whereas in the interval for recording the clock regenerating signal, the generation of addresses is effected in the form of n−k, - - - , n−2, n−1 if the number of blocks in the clock regenerating signal interval is represented by k.

These operations will be described in greater detail in reference to the flow charts of FIGS. 7A and 7B. The number of symbols in each data block is S (block 230). The first generated address value n−k is produced first (processing block 231). A processing block 232 generates a header including an address formed by the generated address, a control signal formed by control data and an error detecting signal (parity check) formed by logically combining the address and the control signal. Then, a decision block 233 makes a decision on the address so that a transfer is made to a processing block 234 where clock regenerating data is added to the header (when address<n is YES) and a transfer is made to a processing block 235 where PCM data is added to the header (when address<n is NO).

Each header is formed by a total of four symbols (S-4), that is, it is formed by a sychronizing signal (which is added by a processing block 236 described later), a control signal, an address and a parity check which are each formed by a single symbol, and the processing block 234 adds to the S-4 symbols data which is useful for clock regenerating purposes (i.e., data which results in a clock regenerating signal after modulation). Similarly, the processing block 235 adds the PCM data and an error correcting code to the S-4 symbols. Finally, the processing block 236 adds a synchronizing signal as mentioned previously thereby completing one data block and the data block is modulated and recorded on a magnetic tape (processing block 237).

Thus, 1 is added to the address value of the data block (processing block 238) to generate the next address, and thereafter the similar processing is repeated.

The operation of recording a carrier suppressed signal as in the case of the previously mentioned S-VHS system will now be described with reference to FIG. 7B. The operation differs from the processing of FIG. 7A in that a synchronizing signal is added in the generation of a header (processing block 250) and that data useful for carrier regeneration and clock regeneration are added by a processing block 251. The data useful for carrier regenration and clock regeneration may be such data having a wavelength which is two times the minimum recording wave length. Also, it is possible to add the carrier regnerating signal to the front block and add the clock regenerating signal to the rear block.

Figure 7A:
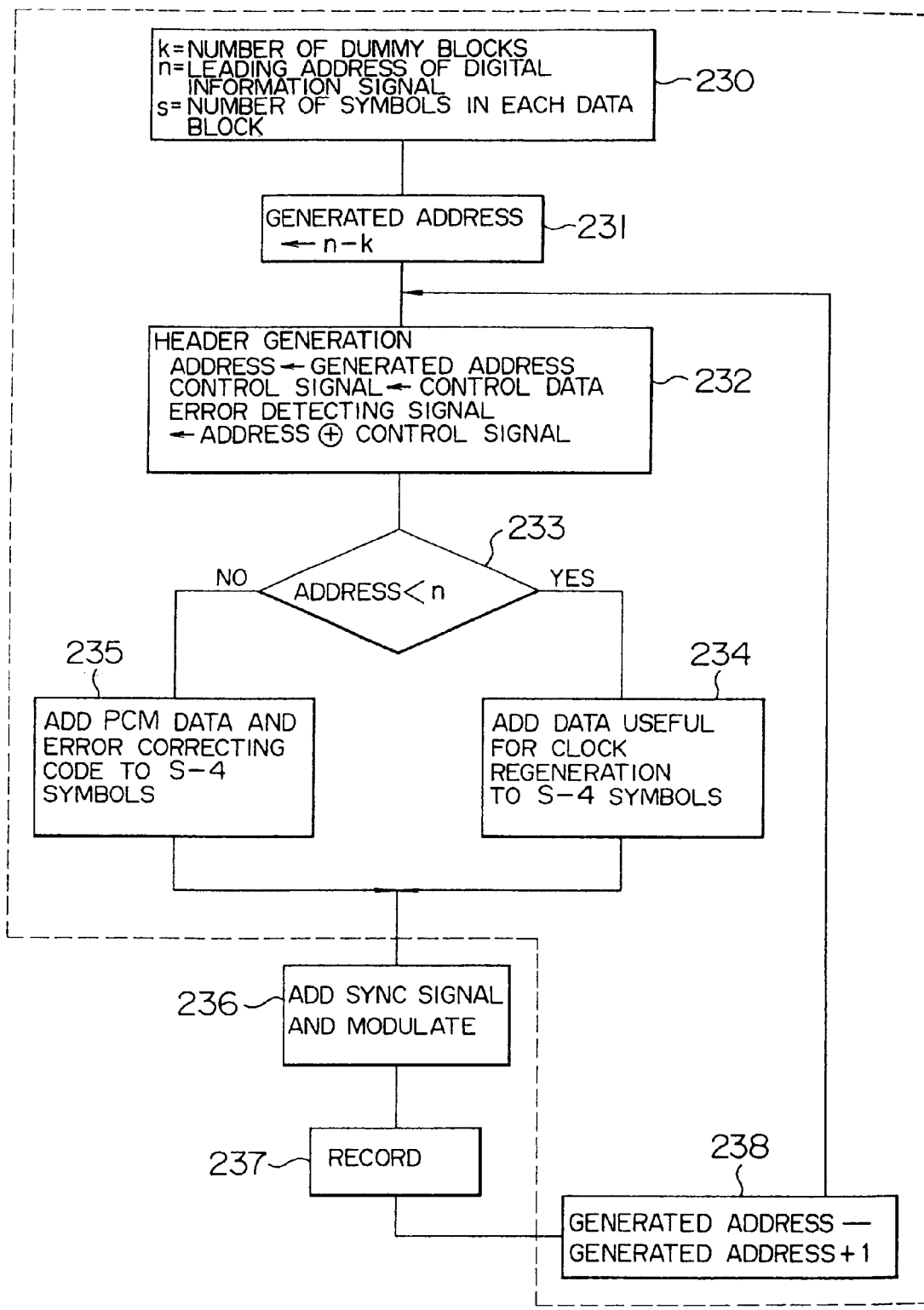
FIGS. 7A and 7B are flow charts showing operations of the header generating circuit of FIG. 6.
Figure 7B:
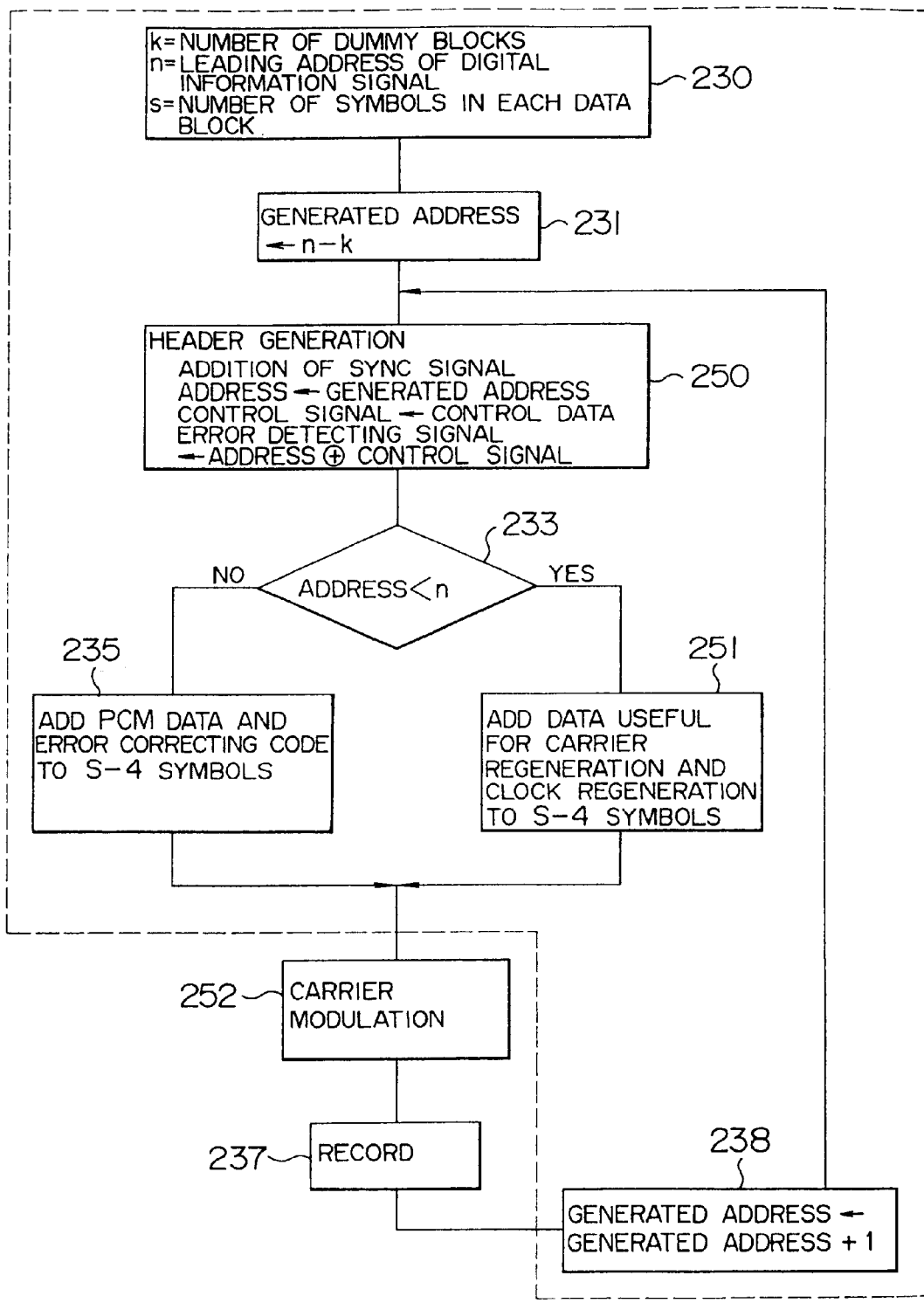

The other processing operations of FIG. 7B are practically the same as FIG. 7A, and a completed data block is carrier modulated (processing block 252) and recorded.

The output of the header generating circuit 205, which generates the header by the above-mentioned operation, and the output of the data selector circuit 204 are applied to another selector circuit 206 which in turn changes its positions at intervals of one data block period irrespective of the interval of the clock regenerating signal (the signal from the data generating circuit) and the interval of the digital information signal. The output of the selector circuit 206 is modulated by a modulator circuit 207 so that the data from the data generating circuit 203 is modulated to a clock regenerating signal. The signal modulated by the modulator circuit 207 is applied to a recording circuit 208 so that the signal is written on the magnetic tape thereby writing in the clock regenerating signal the headers of the same structure as the headers in the digital information signal so as to be synchronized with the latter headers.

An example of a reproducing method according to the present invention will now be described as the fourth embodiment. FIGS. 8A, 8B and 8C show examples of an operation performed when the invention is applied to the reproduction of a digital information signal. FIG. 8B shows an operation performed when the first synchronizing signal of the digital information signal is in error. Since the synchronizing signal is reproduced at a given period as shown in the Figure, if only the single accurate synchronizing signal is reproduced in the clock regenerating signal interval, due to the reproducing period of the synchronizing signals being known preliminarily, by using a synchronous counter which repeats at the period of the synchronizing signals as shown in the Figure, the positions of the synchronizing signals can be detected in accordance with the count values of the synchronous counter. As a result, even if the leading synchronizing signal of the digital information signal is detected in error, the data can be reproduced accurately. At this time, the determination of whether the synchronizing signal is accurate or not is made in such a manner that the control signal (ID code), the address and the error detecting signal (parity code) immediately following the detected synchronizing signal are calculated and the determination is made on the basis of non-existence of error. FIG. 8C shows an operation performed when the first address of the digital information signal is in error. If at least one accurate address is reproduced in the clock regenerating signal interval as shown in the Figure, due to the fact that the reproduction period of the synchronizing signals is known, even if an error is caused in the following addresses, the address value can be counted up at the given period so that the accurate addresses can be generated even though the first address of the digital information signal is in error. At this time, the determination of whether the address is accurate or not is made in the same manner as in the case of FIG. 8B, that is, the control signal, the address and the error detecting signal are calculated and the determination is made on the basis of the non-existence of error and the continuity of the reproduced address.

By using the above-mentioned reproducing system, even if the first synchronizing signal of the digital information signal is in error, synchronization can be maintained starting from the first data of the digital information signal. Also, even if the first address of the digital information signal is in error, by detecting the accurate address in the clock regenerating signal interval, it is possible to generate the accurate address starting at the first data of the digital information signal.

Figure 9:
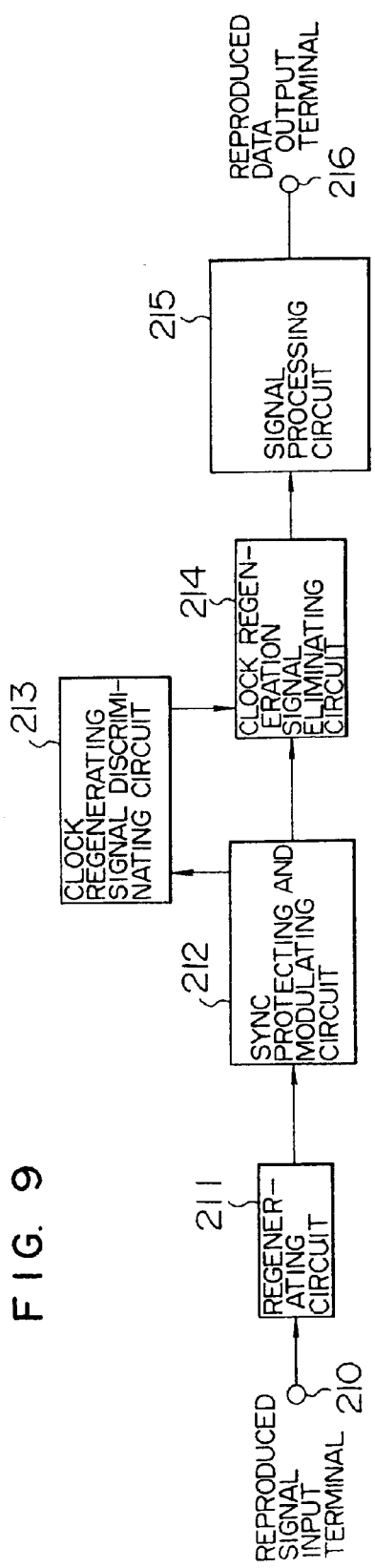
FIG. 9 is a block diagram showing an embodiment of a signal playback apparatus.
Figure 10:
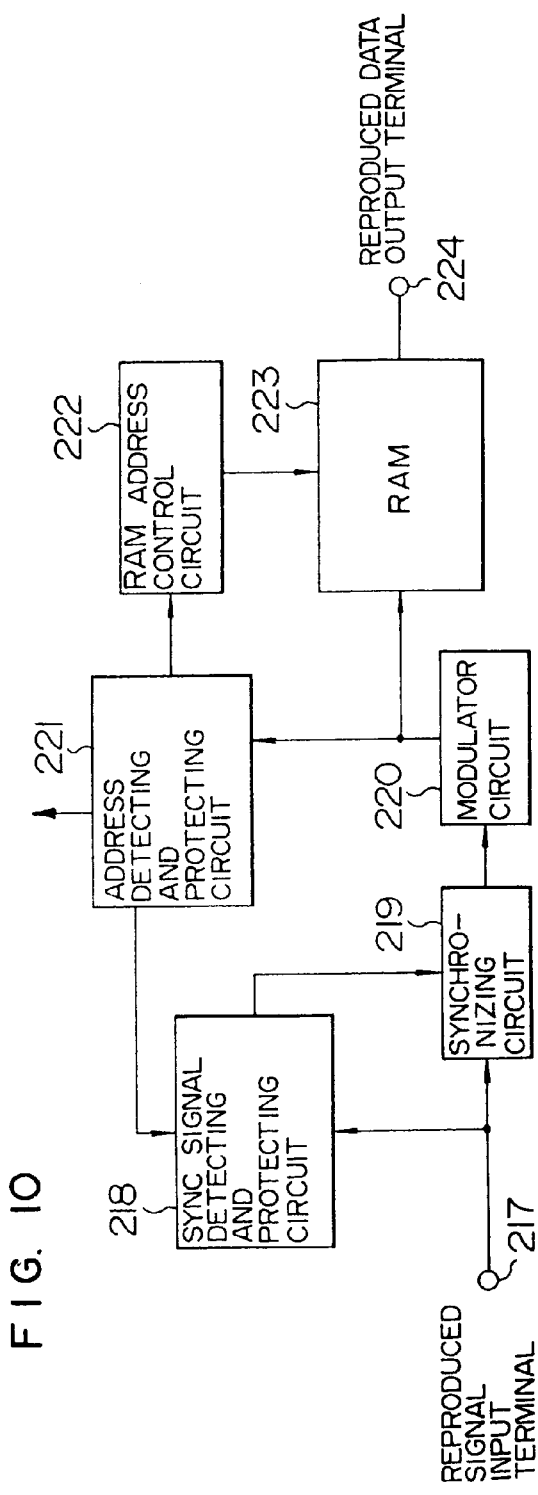
FIG. 10 is a block diagram showing a basic operation of the synchronization protecting and demodulating circuit of FIG. 9.

The fifth embodiment of the invention will now be described. FIG. 9 is a basic block diagram in which the present invention is applied to the reproduction of a signal including a clock regenerating signal and a digital information signal which are divided in area. The reproduced signal applied to a reproduced signal input terminal 210 is subjected to signal amplification and clock regeneration by a regenerating circuit 211 and the resulting digital waveform is applied to a synchronization protecting and modulating circuit 212. The synchronization protecting and modulating circuit 212 performs the following processing. FIG. 10 is a block diagram showing a basic operation of the synchronization protecting and modulating circuit 212. The input reproduced signal is applied to a synchronizing signal detecting and protecting circuit 218 so that the data synchronizing-signal is detected starting from the clock regenerating signal interval and the detected synchronizing signal is checked as to whether it is accurate. If it is determined accurate, the synchronous counter is initialized and the counting is repeated at the reproduction period of the synchronizing signals, thereby maintaining the accurate synchronization. On the contrary, if it is determined inaccurate and there is no preceding accurate synchronizing signal, the detection of the synchronizing signals is always effected. By thus performing a data synchronizing operation starting from the clock regenerative signal interval, it is possible to maintain the synchronization of the data even if the first synchronizing signal of the digital information signal is in error. The data synchronzed by a synchronizing circuit 219 is demodulated by a demodulator circuit 220 to produce digital data. Then, the addresses are detected from the demodulated digital data by an address detecting and protecting circuit 221. The detection of the addresses is also started from the clock regenerating signal interval and a decision is made as to whether the detected address is accurated. If it is determined accurate, the address is maintained. If it is determined inaccurate, an accurate address is generated by using the previously maintained address. By thus performing the address protecting operation starting from the clock regenerating signal interval, it is possible to maintain the proper time sequential order of the data even if the first address of the digital information signal is in error. The addresses generated by the address detecting and protecting circuit 221 are applied to a clock regenerating signal discriminating circuit 213 of FIG. 9 so that the clock regenerating signal and the digital information signal are discriminated from each other and the clock regenerating signal is deleted by a clock regenerating signal eliminating circuit 214. After the clock regenerating signal has been eliminated, the digital information signal is applied to a signal processing circuit 215 which performs an error correcting process and data interleaving thereby reproducing it as the digital information signal.

By thus effecting the protection of the synchronizing signals and the addresses starting from the interval of the clock regenerating signal during the reproduction, it is possible to prevent the occurrence of a burst error at around the top of the digital information signal due to the inaccurate first synchronizing signal or address of the digital information signal.

Figure 11:
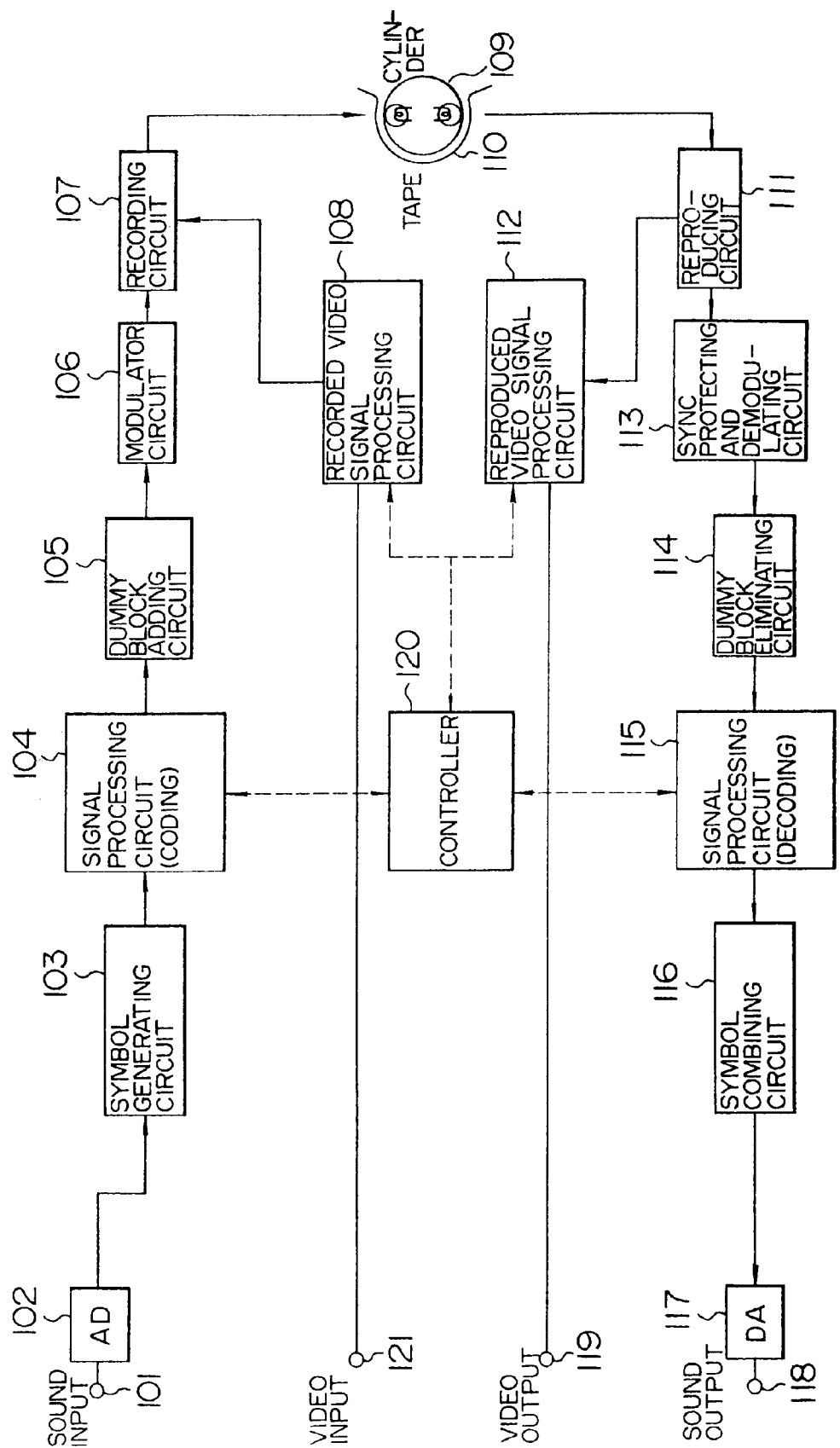
FIG. 11 is a block diagram showing an embodiment of a recording and playback apparatus according to the present invention.

The sixth embodiment of the invention will now be described. FIG. 11 is a basic block diagram of this embodiment in which the invention is applied to an apparatus for recording a digital information signal in burst form on a magnetic tape and reproducing it, e.g., the PCM sound of an 8 mm video tape recorder.

Figure 13:
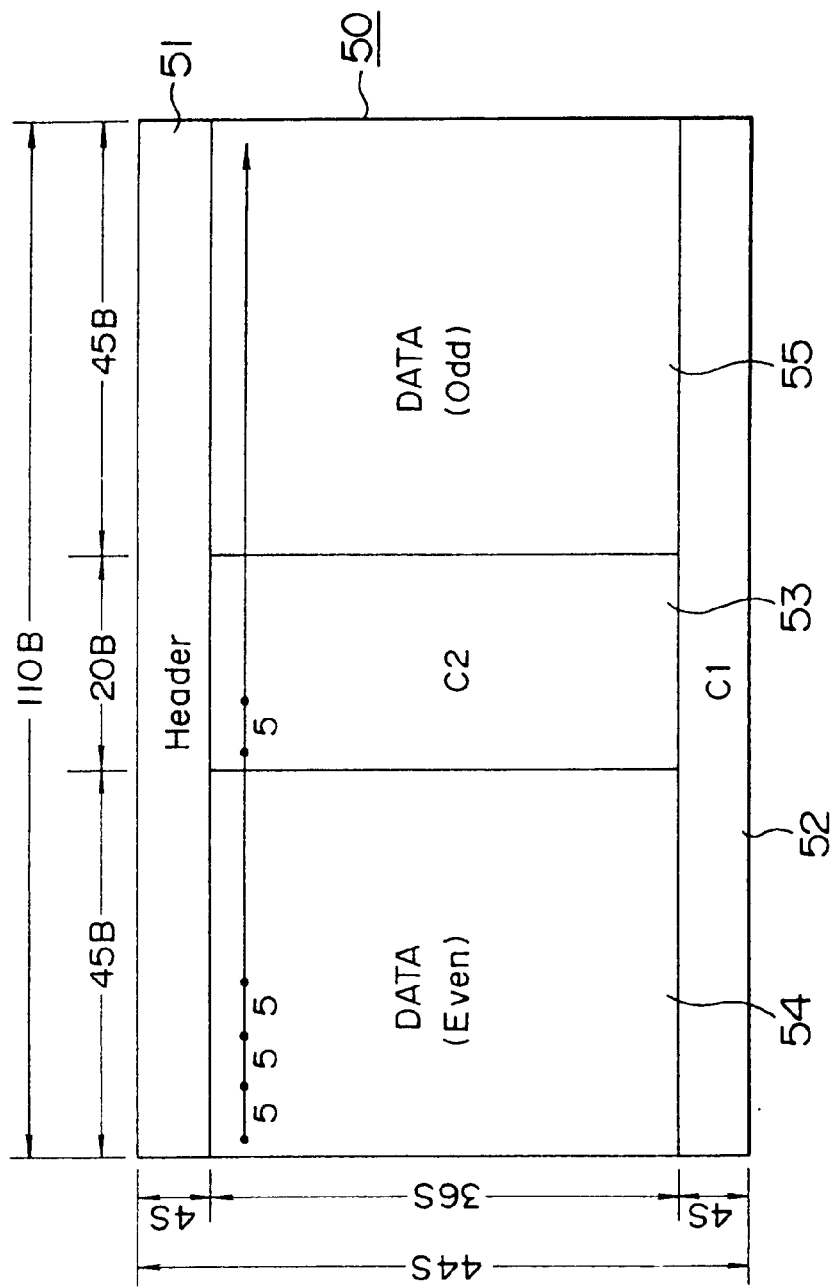
FIG. 13 is a diagram showing the data format used in the embodiment of the present invention.

The operation of the recording system will be described first. The analog signal applied through an analog signal sound input terminal 101 is quantized at a given sampling frequency by an A/D converter 102 thereby converting it to digital signal data in terms of quantization bits. Data in terms of symbols is generated from the converted digital signal data by a symbol generating circuit 103 and a signal processing circuit 104 generates correcting codes, headers, etc., from the symbol data, thereby producing a format 50 such as shown in FIG. 13. In the case of the format shown in FIG. 13, the field frequency of video signal is selected 60/1.001 Hz according to the NTSC and it corresponds to the sound data for one field. While the format of this embodiment will be described on the basis of the NTSC system, the present invention is suitably applicable to any other system such as the PAL system.

The structure of the format 50 includes an array of 110 blocks each including 44 symbols, and a header 51 is provided with a synchronizing signal, ID code (control signal), block address and parity code resulting from an exclusive OR operation on the ID code and the block address. Each block is provided with a 4-symbol $C_1$ code 52, and a single 4-symbol $C_2$ code is added to each $C_2$ code system with an interleave of 5 blocks as shown in FIG. 13 thereby adding a total of 20 blocks of $C_2$ codes 53.

Figure 14:
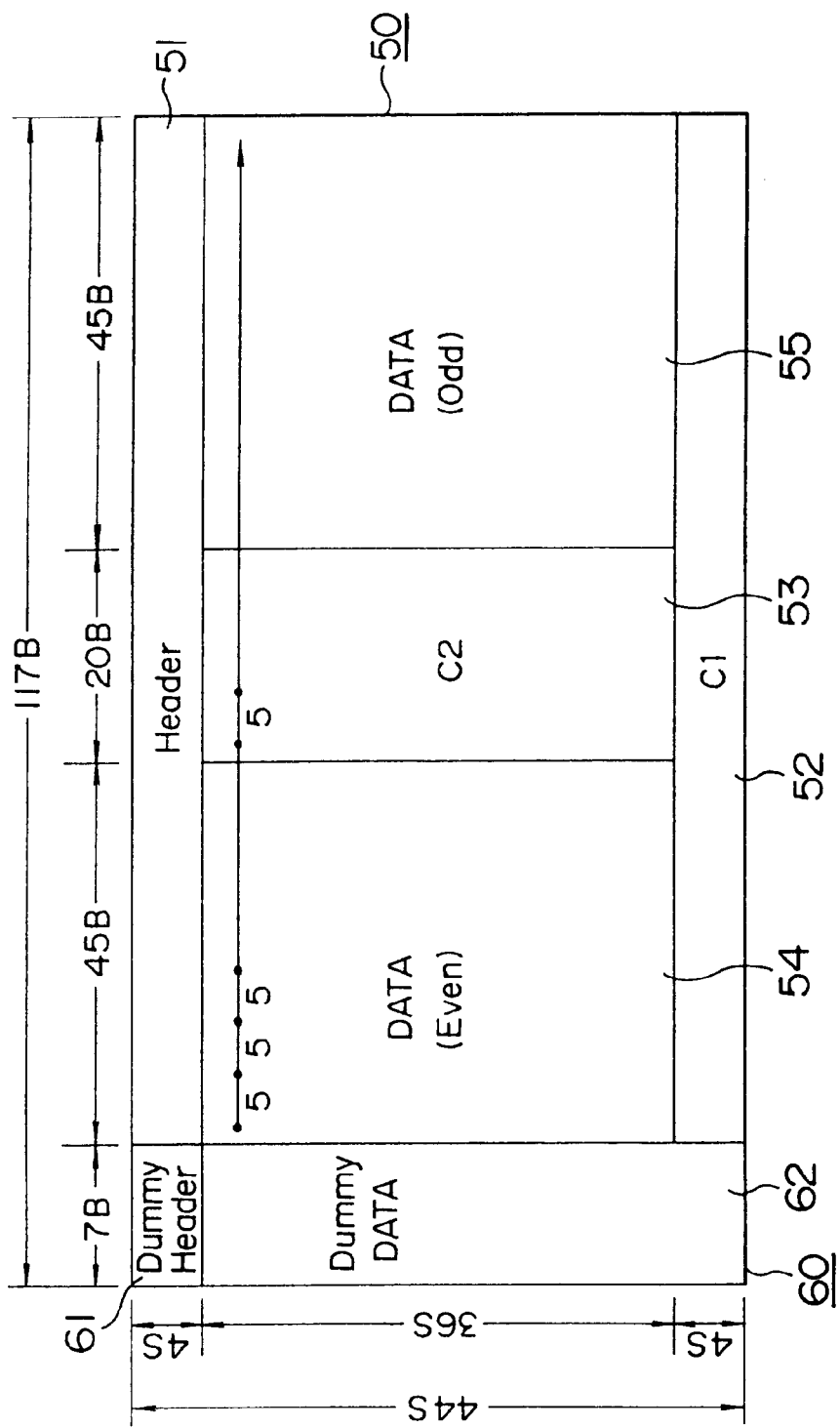
FIG. 14 is a diagram showing an arrangement of the dummy block.
Figure 15:
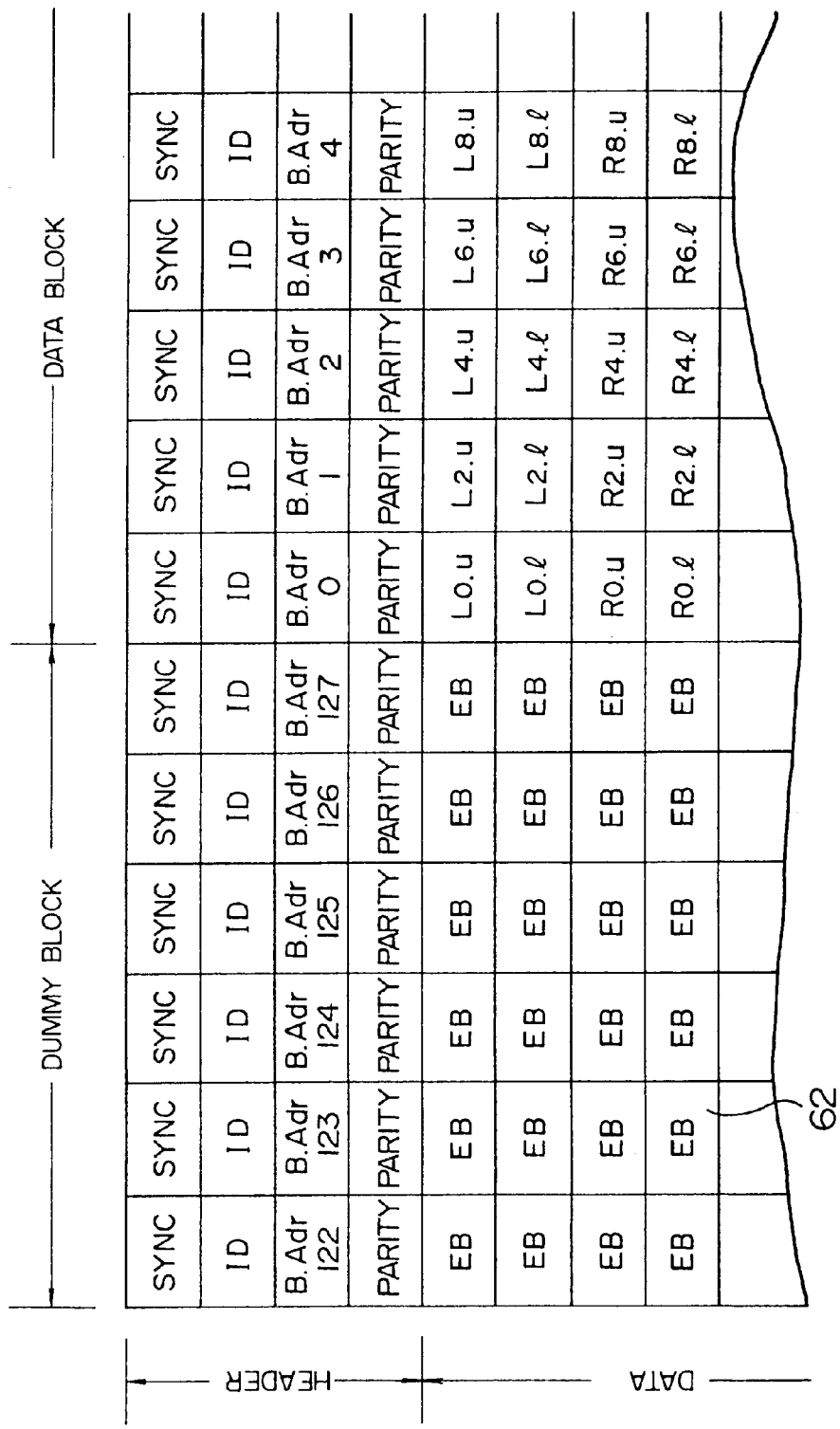
FIG. 15 is a data arrangement diagram showing the content of the dummy block.
Figure 16:
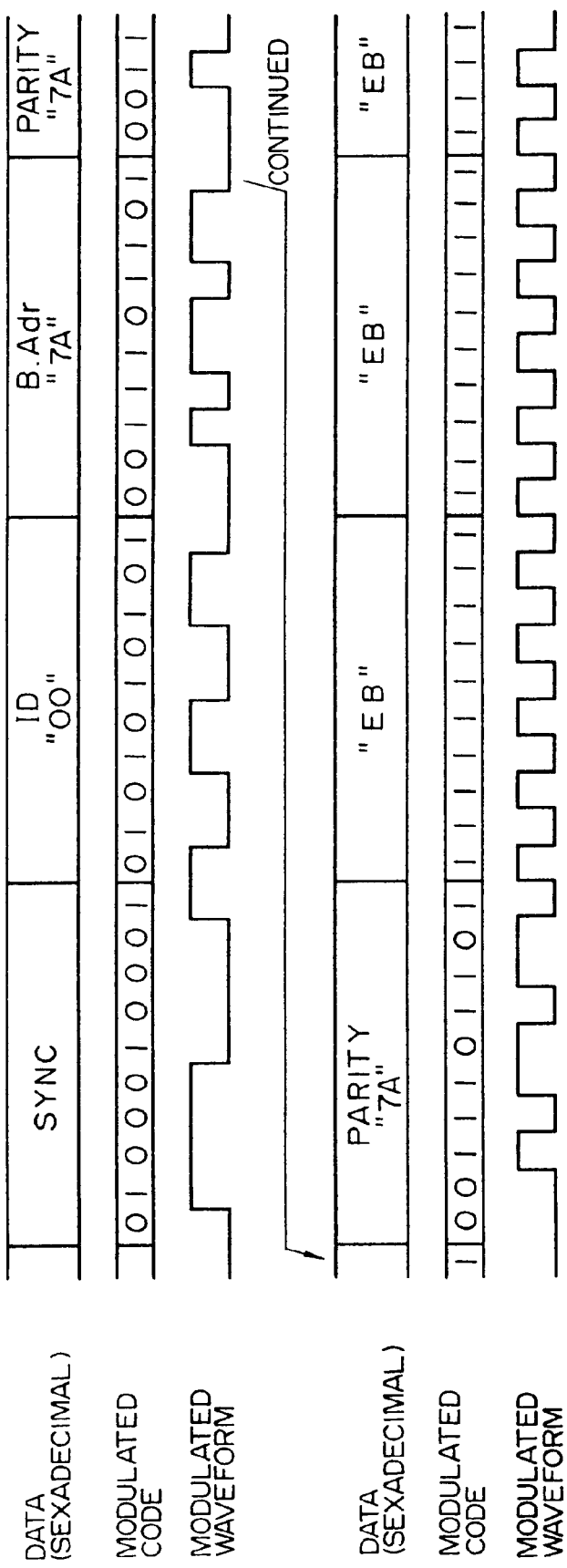
FIG. 16 is a modulated waveform diagram showing the modulated waveform on the tape.

With the format shown in FIG. 13, the data frame 50 is provided with a dummy block 60 by a dummy block adding circuit 105 so as to be placed in a position on the head entry side as shown in FIG. 14. As shown in FIG. 14, the dummy block 60 is provided with dummy headers 61 and each dummy header 61 is provided with a synchronizing signal, ID code (control signal), block address and parity code as in the case of the data block header 51. FIG. 15 shows the header portion in an expanded form. In the Figure, designated by SYNC are synchronizing signals, ID ID codes, B.Adr block addresses, and PARITY parity codes. The block addresses of the dummy block 60 represent an application of the previously mentioned embodiment shown in FIGS. 3 and 4. At this time, the synchronizing signal is replaced by a modulated code of "311" (sexadecimal) or "111" (sexadecimal) by a modulator circuit 106 in correspondence to the preceding modulation pattern. FIG. 16 shows the modulated waveform generated when the leading block of the dummy block is actually recorded on the tape. The modulated waveform is obtained by first converting the data to a modulated code, converting the modulated code to a serial data and then subjecting the serial data to NRZI conversion.

By forming the data 62 in the dummy block into "EB" (sexadecimal), it is converted to "1111111111" (binary) in terms of an 8–10 modulated code (see DIGITAL AUDIO TAPE RECORDER SYSTEM DAT JUNE 1987 THE DAT Conference, PP. 32, 38).

By performing the NRZI conversion, it is possible to produce a continuous modulated waveform of the minimum recording wave length by the output of the modulator circuit 106.

In accordance with this embodiment, due to the use of the 8–10 modulated code, the modulated waveforms of the other data can be limited to a wavelength which is 4 times the minimum recording wave length at the most (i.e., the modulated waveform of sync) and there is practically no effect on the pull-in time during the clock regeneration.

After the dummy block 60 of FIG. 14 has been added in this way, the data frame 50 is modulated by the modulator circuit 106 and it is then applied to a recording circuit 107. In this case, the video signal applied through a video input terminal 12 is also processed by a recording video signal processing circuit 108 thereby applying it to the recording circuit 107. The recording circuit 107 distributes the PCM signal and the video signal to the two heads of a cylinder 109 thereby recording the signals on a magnetic tape 110 in the form of a new 8 mm track format 32 of FIG. 12 in which the overlap area is expanded by 5 degrees as compared with the previously mentioned conventional PCM signal.

Figure 17:
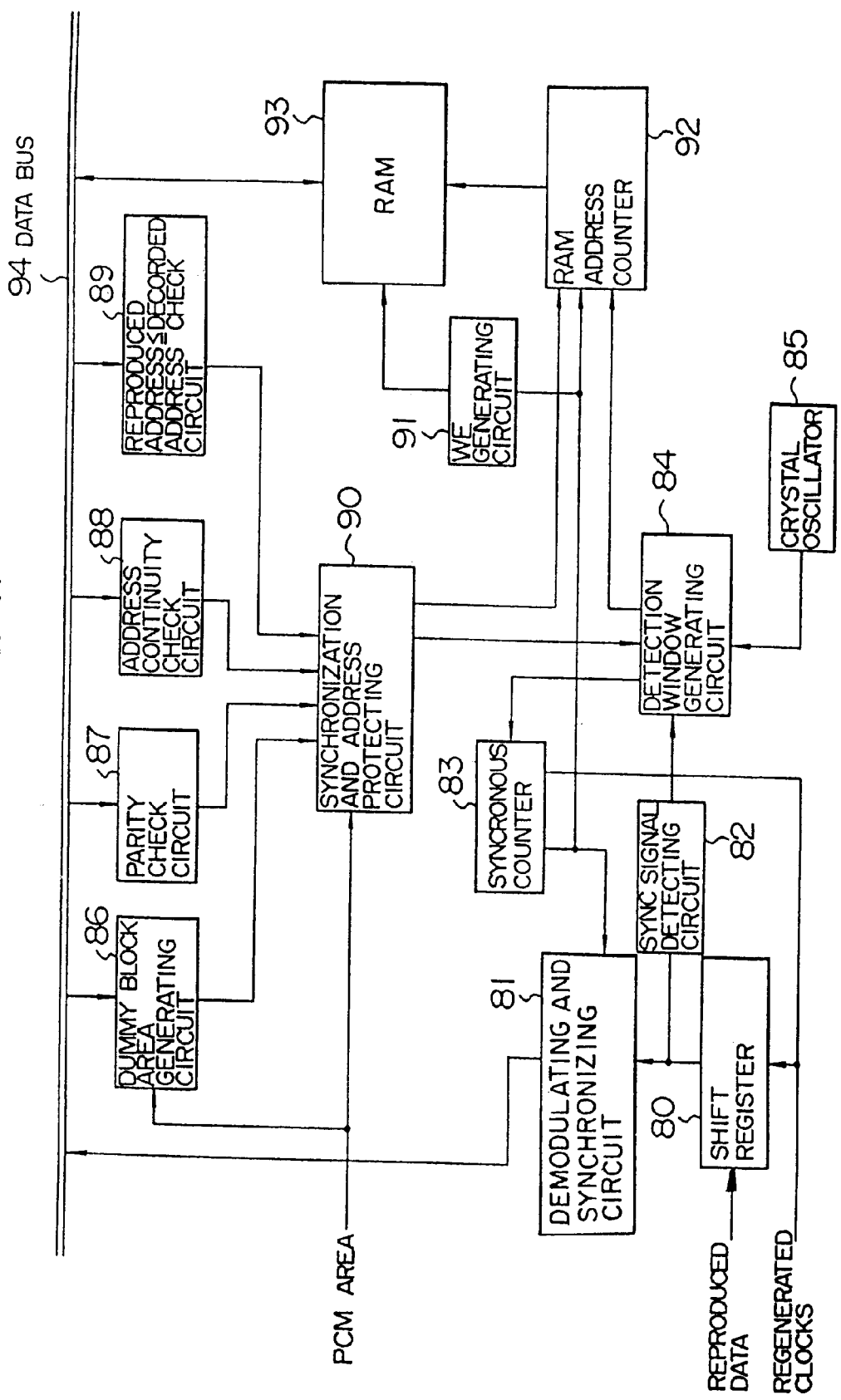
FIG. 17 is a block diagram showing the operation of the synchronization protecting and demodulating circuit of FIG. 11.

Next, the operation of the playback system will be described. The magnetic record pattern on the magnetic tape 110 is detected by the two heads of the cylinder 109 and the reproduced signal is applied to a playback circuit 111. The playback circuit 111 amplifies and divides the signal into the PCM signal and the video signal according to the recording areas so that the video signal is applied to a reproduced video signal processing circuit 112 and the PCM signal is subjected to clock regeneration thereby applying the signal as serial digital signal data, along with the regenerative clocks, to a synchronization protecting and modulating circuit 113. The synchronization protecting and modulating circuit 113 performs the protection and demodulation of the synchronizing signals and the blocks addresses. FIG. 17 is a block diagram showing the overall operation of the synchronization protecting and demodulating circuit 113 and a dummy block eliminating circuit 114 and the operation will now be described.

The reproduced data and the regenerated clocks are applied to a shift register 80 which converts the input data to a parallel signal and a synchronizing signal detecting circuit 82 detects the synchronizing signals. After the synchronizing signals have been detected, the detected signals are applied to a synchronous counter 83 through a detection window generating circuit 84 thereby providing synchronization in terms of symbols. A demodulating and synchronizing circuit 81 effects the synchronization and demodulation in terms of symbols. In this case, the protection of the synchronizing signals is effected by a synchronization and address protecting circuit 90 and the detection window generating circuit 84. The basic operation utilizes the fact that the synchronizing signals are reproduced at the rate of one for every block at intervals of the given time. In other words, after the regular synchronizing signal has been detected for the first time, the synchronizing signals are detected only for the detection window at intervals of a certain time, whereas when the regular synchronizing signal is not detected, the protection of synchronization (the maintenance of the preceding synchronous state) is effected for the interval of the several blocks. Thereafter, if any synchronizing signal is not detected, a search is made again for the regular synchronizing signal. In this case, the normality of the synchronizing signal is determined in accordance with the normality of the block address. By effecting the synchronization protection by such procedure, errors in the synchronizing signals and demodualtion of the reproduced signal can be dealt with. The thus synchronized symbol data is written in an RAM 93 through a data bus 94.

The protection of the addresses during the writing into the RAM 93 will now be described. The block addresses correspond to the addresses in the RAM 93 and thus if any error is caused in the addresses so that the data is written at the inaccurate RAM address, the time sequential order of the reproduced signal is deranged and it leads to inaccuracy of the blocks on the whole. Therefore, the protection of the addresses must be effected effectively. In the apparatus of the embodiment shown in FIG. 17, the normality of the addresses is determined in such a manner that the provision of protection is determined in accordance with the results of ① a parity check circuit 87 for checking the parity of the header 51, ② an address continuity check circuit 88 and ③ a reproduced address≦decoded address check circuit 89. In other words, only those addresses which have passed the above checks ① to ③ are determined as being accurate and the reproduced addresses are used as the RAM addresses. If the reproduced address is in error so that the address fails to pass these checks ① to ③, the address protection is performed and the count value from the accurate address preceding the occurrence of the inaccurate reproduced address is used as the RAM address.

By providing such address protection, it is possible to generate a highly reliable RAM addresses even if any block address, ID code (control signal) or parity code of the header is detected as being in error.

Let us consider for purposes of comparison the reproduction of the conventional data format which has not been provided with the dummy block. Consider first a case where during the synchronization the synchronizing signal of the leading block is in error so that the synchronizing signal cannot be detected by the synchronizing signal detecting circuit 82. In this case, since the error is in the leading block so that there is no synchronization to be referred to, no synchronization protection can be provided. Thus, the synchronization in terms of symbols cannot be provided so that all the data are in error until the normal synchronizing signal is detected next.

Next, considering a case where the block address of the leading block is in error, then there exists no accurate address preceding the occurrence of the error and thus the protection cannot be effected. Also, it is impossible to show the number of this block in the sequence. As a result, the whole block is considered to be in error and a "0" is written in the address of the RAM 93.

Thus, where errors are caused in the header of the leading block, it is difficult to protect the leading synchronizing signal and the leading block address and the provided protection, if any, will be less effective one using an area signal or the like. However, by adding the dummy block 60 shown in FIG. 14 to the data frame 50 as in the embodiment of the present invention, although the leading synchronizing signal of the data block is in error, if the normal synchronizing signal can be detected during the reproduction of the several blocks of the dummy block 60, there is no danger of causing a burst error of a length corresponding to the block due to the synchronization error in the leading data block.

It is to be noted that even if the leading synchronizing signal of the dummy headers 61 is in error, this only causes the leading block of the dummy block 60 to be in error.

Also, where the leading address of the data blocks is in error, by designating the block addresses in the headers of the dummy block as shown in FIG. 5 so as to permit the prediction of the position of the leading data block, the data of this block can be written in the accurate address of the RAM 93. Also, although the leading address and the block address of the dummy block are simultaneously in error, if the normal block address is detected during the reproduction of the several blocks of the dummy block 60, in accordance with the time-like count value from the detected block address the address protection can be effected even if an address error is caused in the leading data block and the data block can similarly be written in the accurate address of the RAM 93. It is to be noted that even if the address error is caused in the dummy block as mentioned above, this portion is a dummy and therefore no inconvenience is caused.

It is to be noted that where the accurate block address is detected from the dummy block, while a processing is required such that the dummy data of the dummy block is not written in the RAM 93, the block address of the dummy block has a value which does not exist in the addresses of the data blocks and therefore it can be easily discriminated by a dummy block discriminating circuit 86. Also, even if the dummy data is written in the RAM 93, it is only necessary to perform a signal processing such that the RAM address in question is not used. Also, the control information corresponding to the control signals (ID codes) of the data frame are written in the control signals (ID codes) of the dummy block according to the block addresses.

Figure 12:
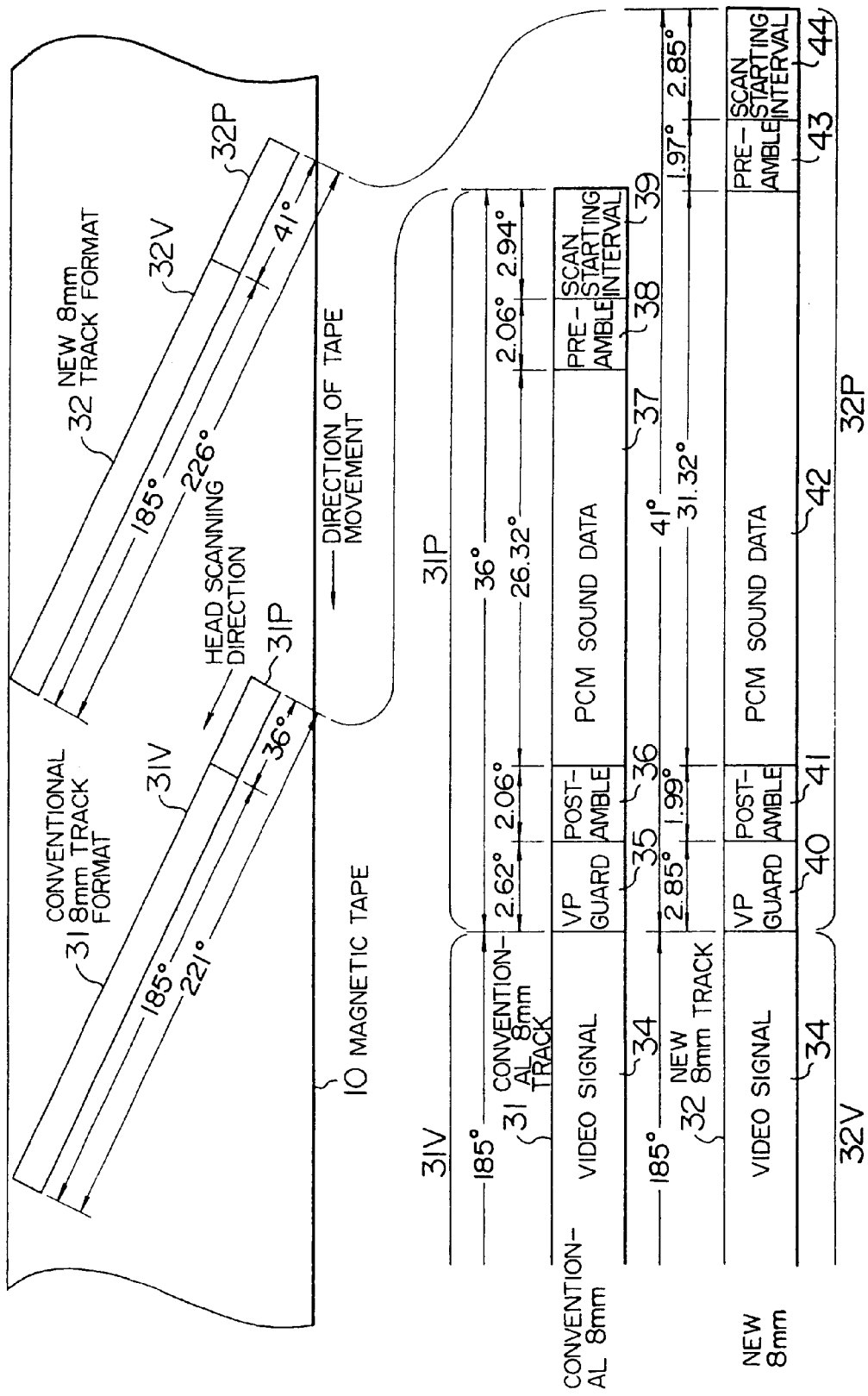
FIG. 12 is a track format diagram showing the track formats on a tape.

Let us now consider the reproduction of PCM sound from an 8 mm video tape recorder which records and plays back the previously mentioned, 16-bit PCM sound. Where the conventional data frame provided with no dummy block 60 such as shown in FIG. 13 is reproduced, burst errors of the block length are caused until the normal synchronizing signal is next detected from the leading data block as mentioned previously. Thus, since the top of the PCM sound data 42 comes closer to the lower edge of the tape due to the expansion of the overlap area as shown in FIG. 12, when the cylinder heads 9 come in, the tape 10 is turned up thereby reducing the reproduced output due to the effect of the increased gap between the tape 10 and the heads 9. As a result, the error rate is deteriorated at around the head of the PCM sound data 42 and this increases the probability of failing to detect the synchronizing signal of the leading data block. Therefore, the probability of causing a burst error of the block length from the leading data block is increased and hence the probability of generating the sound by interpolation of the data is increased, thus causing deterioration of the sound quality.

Therefore, the dummy block 60 is added to the data frame 50 in the previously mentioned manner.

By applying the method and apparatus of the present embodiment to a 8 mm video tape recorder which records and reproduces such PCM sound, even if errors are caused in the leading data block during the sound reproduction, it is possible to provide protection for the synchronizing signal and the block address thereby reducing the probability of causing a burst error of the block length due to a synchronization error or RAM address error. In other words, when a synchronization error or RAM address error is caused in the leading data block of the data frame provided with the dummy block, this means a case where errors are caused in all the headers 61 of the dummy block 60 and its probability is extremely small.

In this way, the data written in the RAM 93 is subjected to error detection and processing of the ID codes (control signals) by a signal processing circuit 115 and a symbol composing circuit 116 composes word data of a given number of quantization bits from the symbol data. Then, a D/A converter 117 converts the digital signal data to analog signal data and a sound signal is generated from a sound output terminal 118.

While the embodiments of the recording and playback apparatus according to the invention have been described as applied to an 8 mm video tape recorder with PCM sound to show its effects, the recording and playback apparatus of this invention is not limited to the 8 mm video tape recorder and it is suitably applicable to apparatus of the type employing cylinder heads to record a digital signal in burst form on a magnetic recording medium, such as, a video tape recorder and other apparatus for recording and reproducing video signals and PCM sound signals, apparatus for recording video signals themselves in PCM form, and apparatus for recording only sound signals in PCM form such as a DAT.

What is claimed is:

1. An apparatus for making a correspondence between digital information in electric signal form and information in magnetic signal form recorded in helical tracks on a magnetic recording tape, comprising:

a magnetic transducing head;

a head driving mechanism which causes said magnetic transducing head to scan on said helical tracks from a preamble portion disposed at a lower side of said magnetic recording tape preceding a digital signal information portion that includes a plurality of data blocks, each data block including a first header containing a first synchronizing signal and a first address signal; and a control circuit which determines a start timing of said digital information in response to a plurality of spaced-apart second header signals in said preamble portion transduced between said head and said tape;

wherein each of said second header signals includes a second synchronizing signal corresponding to said first synchronizing signal, and a second address signal in continuity with said first address signal.

2. The apparatus of claim 1, wherein each of said second header signals further includes a parity signal for correcting an error.

3. The apparatus of claim 2, wherein each of said second header signals further includes an identification signal for controlling said digital information.

4. The apparatus of claim 1, wherein said control circuit further determines and protects a synchronous state based on said second header signals already transduced.

5. An apparatus for recording digital information into helical tracks on a magnetic tape, comprising:

a rotary magnetic head;

a head driving mechanism which causes said rotary magnetic head to scan on said helical tracks from a preamble portion disposed at a lower side of said magnetic recording tape preceding a digital signal information portion that includes a plurality of data blocks, each data block including a first header containing a first synchronizing signal and a first address signal; and a control circuit which controls a recording sequence to record second header signals spaced apart in said preamble portion before recording said digital information on each of said helical tracks;

wherein each of said second header signals includes a second synchronizing signal corresponding to said first synchronizing signal, and a second address signal in continuity with said first address signal; and wherein a timing for start of reproducing of said digital information is determined in response to reading said second synchronizing signals while reproducing.

6. The apparatus of claim 5, wherein each of said second header signals further includes a parity signal for correcting an error.

7. The apparatus of claim 6, wherein each of said second header signals further includes an identification signal for controlling said digital information.

8. The apparatus of claim 5, wherein said control circuit records said second header signals for protecting a synchronous state in reproducing mode.

* * * * *